Dec. 11, 1923.

D. MARTIN

SKINNING KNIFE

Filed Oct. 28, 1922

1,477,510

WITNESS:
F.E. Cole

David Martin
INVENTOR
BY Victor J. Evans
ATTORNEY

Patented Dec. 11, 1923.

1,477,510

UNITED STATES PATENT OFFICE.

DAVID MARTIN, OF WATSON, ILLINOIS.

SKINNING KNIFE.

Application filed October 28, 1922. Serial No. 597,624.

*To all whom it may concern:*

Be it known that I, DAVID MARTIN, a citizen of the United States, residing at Watson, in the county of Effingham and State of Illinois, have invented new and useful Improvements in Skinning Knives, of which the following is a specification.

This invention relates to cutlery and has for its object the provision of a novel knife designed for use by hunters, trappers and in fact all others having occasion to skin animals, the knife being of such construction that it will very quickly and easily operate to rip the skin without gouging the flesh.

An additional object is the provision of a knife of this character which will be simple and inexpensive in manufacture, efficient and durable in service and a general improvement in the art.

With the above and other objects and advantages in view the invention consists in the details of construction to be hereinafter more fully described and claimed and illustrated in the accompanying drawings, in which:

Figure 1:
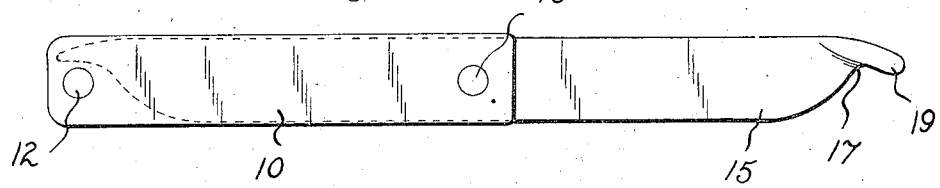
Figure 1 is an elevation of my knife.
Figure 2:
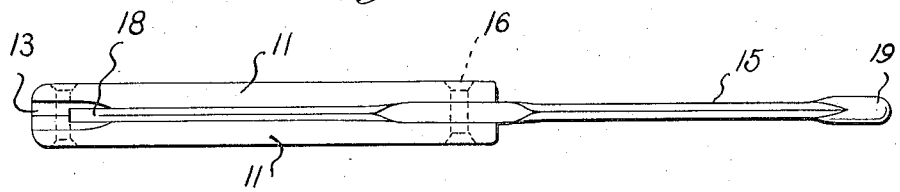
Figure 2 is an edge view.
Figure 4:
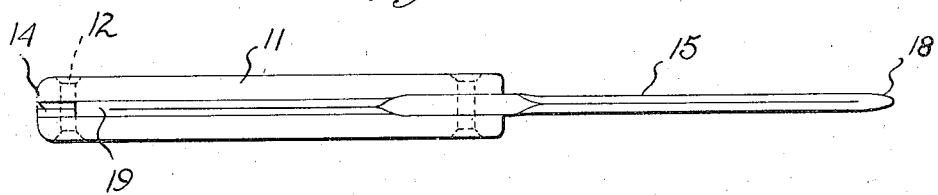
Figure 4 is an elevation of the opposite edge of the handle.
Figure 3:
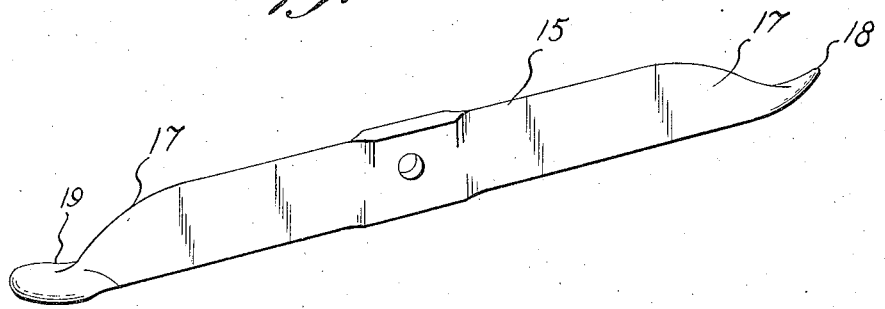
Figure 3 is a detail perspective view of the blade removed from the handle.

Referring more particularly to the drawings I have shown my knife as comprising a handle 10 formed of side plates 11 connected at one end by rivet or the like 12. One edge of the handle is recessed near this rivet as shown at 13 while the opposite edge is likewise recessed, though in a slightly different manner as indicated at 14.

The numeral 15 designates the blade which is disposed between the plates 11 of the handle and pivotally mounted by a rivet 16 or the like which further operates to hold the handle together. It will be noted that this blade is pivoted at substantially its center so that either end thereof may be used with the other end lying within the handle. Each end of the blade is formed with a sharp curved edge 17 and one end is formed with a curved point 18 which is of the same thickness as the blade. The other end is provided with a widened portion 19 which is thicker than the blade and which is blunt and curved as shown.

In the use of the knife it will be seen that either end of the blade may be extended for use with the other end located within the handle, the recess 13 or 14 receiving the points 19 or 18 of the blade as the case may be. In using the device a small hole is cut in the hide or skin to be removed and the point 18 or 19 is inserted therein, after which the operator moves the knife along whereupon the edge 17 will slit the skin while the bluntness of the point and the curvature thereof will prevent gouging of the flesh.

From the foregoing description and a study of the drawings it will be apparent that I have thus provided a simply constructed and consequently inexpensive knife which will be a great time and labor saver for hunters, trappers and others having occasion to skin and dress animals, the knife being furthermore advantageous for use in gutting as well as skinning.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A knife comprising a handle including side plates secured together and formed to define a space between them, means securing the side plates together, the opposite edges of the handle being recessed, a blade pivoted intermediate its ends between the side plates of the handle and adapted to have either end extending with the other end fitting within the handle, each end of the blade having a curved cutting edge and oppositely curved blunt point, one blunt point being of the same thickness as the blade and the other being considerably wider, said recess in the handle being for the accommodation of said blunt point.

In testimony whereof I affix my signature.

DAVID MARTIN.